(12) United States Patent
German

(10) Patent No.: US 7,354,231 B2
(45) Date of Patent: Apr. 8, 2008

(54) INTERMODEL TRUCK

(76) Inventor: Steve German, 25233 Loytan St., D, Torrance, CA (US) 90505

( * ) Notice: Subject to any disclaimer, the term of this patent is extended or adjusted under 35 U.S.C. 154(b) by 0 days.

(21) Appl. No.: 11/645,480

(22) Filed: Dec. 26, 2006

(65) Prior Publication Data
US 2007/0144805 A1   Jun. 28, 2007

Related U.S. Application Data

(60) Provisional application No. 60/597,913, filed on Dec. 23, 2005.

(51) Int. Cl.
*B61D 45/00* (2006.01)

(52) U.S. Cl. .............. 410/32; 410/54; 410/66; 410/68; 296/182.1

(58) Field of Classification Search .......... 410/31, 410/32, 44, 54, 66, 71, 82, 68; 220/1.5, 23.6; 296/182.1
See application file for complete search history.

(56) References Cited

U.S. PATENT DOCUMENTS

| | | |
|---|---|---|
| 4,165,007 A | 8/1979 | Brown |
| 4,359,958 A | 11/1982 | Durant |
| 5,562,390 A | 10/1996 | Christenson |
| 5,829,946 A | 11/1998 | McNeilus |
| 5,996,171 A | 12/1999 | Bowers |
| 6,053,692 A | 4/2000 | Mason |
| 6,299,008 B1 | 10/2001 | Payne |
| 6,538,259 B2 | 3/2003 | Matsunaga |
| 6,729,817 B1 * | 5/2004 | Fennell ................ 410/56 |
| 7,014,270 B2 | 3/2006 | Keech |
| 7,066,705 B1 | 6/2006 | Keller |
| 7,126,480 B2 | 10/2006 | Mallett |

* cited by examiner

*Primary Examiner*—Stephen Gordon
(74) *Attorney, Agent, or Firm*—Marcia A. Devon

(57) ABSTRACT

A combination shipping container and vehicle is disclosed that may be handled and lifted in a similar fashion to a standard shipping container, and also may provide its own motive force for driving as a vehicle. The combination includes a vehicle frame that is generally the length and width of the standard shipping container. The frame provides a strong support framework for the combination. An engine is supported by the frame, and a suspension supports at least four wheels by the frame. A transmission mounted to the frame transfers rotational energy from the engine to at least two of the wheels through a transfer case and an axle. A driver's cab is fixed to and above the frame at a forward end thereof and includes driver controls for controlling the engine, steering and braking of at least two of the wheels, and other related motor vehicle functions. A container portion is fixed to and above the frame at a rear end thereof. The container portion is substantially hollow and is adapted for cargo to be transported therein. The length and width of the combination is approximately that of a standard shipping container, and the overall height of the combination is the height of the standard shipping container plus the height of the frame plus half of a height of the wheels. The frame may further include a license plate holder, a flap for each wheel, and any other required equipment to conform to vehicular laws in various jurisdictions.

11 Claims, 3 Drawing Sheets

INTERMODEL TRUCK

CROSS-REFERENCE TO RELATED APPLICATIONS

This application claims the benefit of U.S. Provisional Patent Application 60/597,913, filed on Dec. 23, 2005.

FIELD OF THE INVENTION

This invention relates to vehicles, and more particularly to a shipping container vehicle.

DISCUSSION OF RELATED ART

Standard ISO (International Shipping Organization) shipping containers are used throughout the world to transport cargo and goods. Typically such containers are loaded onto a ship at a port of origin, shipped to a destination port, unloaded into stacks, and then transported by rail or flatbed truck to their subsequent destinations. Stacks of unloaded containers may sit for days before suitable transportation equipment is available to take each container to its next destination. The bottlenecks in such cargo operations are typically due to the limited number of trucks available for transporting the containers from either the destination port or the end rail terminal to the final destination. As a result, cargo can sit idle for days while a limited number of trucks make their runs clearing the stacks of cargo containers.

If the containers to be transported immediately upon unloading from a railcar or a cargo ship, for example, to their next destination, stacks of cargo containers would be eliminated and cargo would arrive at its final destination more quickly. Heretofore, no such practical method has been devised.

Therefore, there is a need for a cargo container that may be driven under its own motive power. A cargo container is needed which is immediately transportable so as to move the cargo to its next destination more rapidly. The desired cargo container is capable of being stacked with standard shipping containers, and would be able to be handled and transported in a similar manner as the standard cargo containers. Further, such a needed container design would be only slightly heavier than a standard shipping container to maintain efficiency in cargo operations using such a device. The present invention accomplishes these objectives.

SUMMARY OF THE INVENTION

The present device is a combination shipping container and vehicle that may be handled and lifted in a similar fashion to a standard shipping container, and also provide its own motive force for driving as a vehicle. The combination container and vehicle may be lifted by a crane, or similar container lifting device onto a ship, a rail car, or the like. Upon unloading, the combination may be driven under its own power as a vehicle, making the combination extremely versatile in how it is used and handled.

The combination includes a vehicle frame that is generally the length and width of the standard shipping container. The frame provides a strong support framework for the combination, and preferably includes two generally horizontal and parallel forklift pockets therein An engine is supported by the frame, and a suspension supports at least four wheels by the frame. A transmission transfers rotational energy from the engine to at least two of the wheels through a transfer case and an axle, also as known in the art, and may further provide rotational energy to the at least four wheels.

A driver's cab is fixed to and above the frame at a forward end thereof. The driver's cab includes driver controls for controlling the engine means, steering and braking of at least two of the wheels, and other related motor vehicle functions as would be known in the art. Running lights, tail lights, and headlights are further included and controlled by the driver controls in the driver's cab.

At least two corner fittings are included in upper forward corners of the driver's cab for facilitating lifting of the combination by the crane. The corner fittings are each made of rigid, strong metallic material and are rigidly connected to the combination such that the combination may be safely lifted and handled thereby.

A container portion is fixed to and above the frame at a rear end thereof. The container portion is substantially hollow and is adapted for cargo to be transported therein. The container portion includes at least two of the corner fittings in upper rear corners thereof, and further includes rear doors and at least one side door, each door similar to those of the standard shipping container.

The overall height of the combination is the height of the standard shipping container plus the height of the frame plus half of a height of the wheels. The frame may further include a license plate holder, a flap for each wheel, and any other required equipment to conform to vehicular laws in various jurisdictions.

The present invention is a combination cargo container and vehicle that may be driven under its own motive power. The present device is able to transport just a bit less cargo than a standard shipping container, but is immediately transportable so as to more quickly move the cargo to its next destination. The present invention may be stacked with standard shipping containers, and is generally able to be handled and transported in the same fashion. Further, such a needed device would be only slightly heavier than a standard shipping container to maintain efficiency in cargo operations using such a device. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
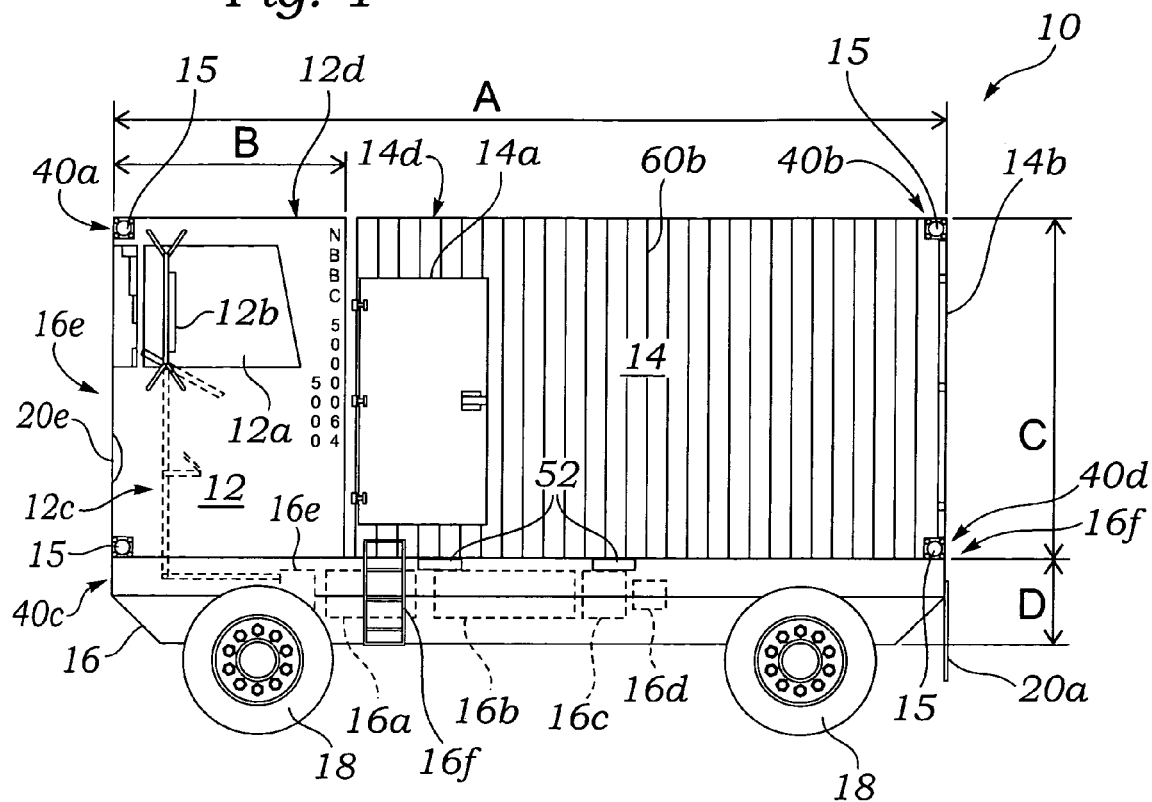
FIG. 1 is a left-side elevational view of the invention, illustrating a vehicle frame supporting a driver's cab and a container portion.

FIG. 1 illustrates a combination shipping container and vehicle 10 that may be handled and lifted in a similar fashion to a standard ISO shipping container 32 (FIG. 5), and also provide its own motive force for being driven as a vehicle. The combination 10 may be lifted by a crane 22, or similar container lifting device (FIG. 4) onto a ship 26 (FIG. 5), a rail car 29 (FIG. 6), or the like. Upon unloading the combination 10 may be driven under its own power as a vehicle, making the combination 10 extremely versatile in how may be used and handled.

The combination 10 includes a vehicle frame 16 that is generally the length A and width F of the standard shipping container 32, typically twenty or forty feet and eight feet, respectively. The frame 16 provides a strong support framework for the combination 10, and is comprised of a strong rigid material such as iron, or the like. The frame 16 preferably includes two generally horizontal and parallel forklift pockets 52 therein, such that a forklift (not shown) may engage the forklift pockets 52 to lift the combination 10. Preferably the center of gravity of the combination 10 is located horizontally between the forklift pockets 52, such that the combination 10 is balanced when lifted by the forklift. In the case where the combination includes an unbalanced load of cargo, however, additional forklift pockets (not shown) may be included along the frame 16 such that any suitable two of a plurality of the forklift pockets. The forklift operation may select which of forklift pockets can be used based on the center of gravity of the combination 10.

An engine 16b is supported by the frame 16. Preferably the engine 16b is a diesel engine and further includes a fuel tank 16a in liquid communication therewith, as is known in the art. The engine means 16b may be any other type of engine commonly used in the art, provided the engine means 16b is relatively light-weight so that transporting the combination 10 to maximize the engine efficiency. A suspension 18b supports at least four wheels 18 by the frame. A transmission means 16c transfers rotational energy from the engine 16b to at least two of the wheels 18 through a transfer case 16d and an axle 18b, also as known in the art, and may further provide rotational energy to the at least four wheels 18.

A driver's cab 12 is fixed to and above the frame at a forward end 16e of the frame 16. The driver's cab 12 includes driver controls 12c for controlling the engine means 16b, steering and braking of at least two of the wheels 18, and other related motor vehicle functions as would be known in the art. The driver's cab 12 is preferably made from a lightweight material, such as aluminum or fiberglass, also as known in the art. The driver's cab 12 preferably further includes side and front windows 12e, also as known in the art.

Figure 4:
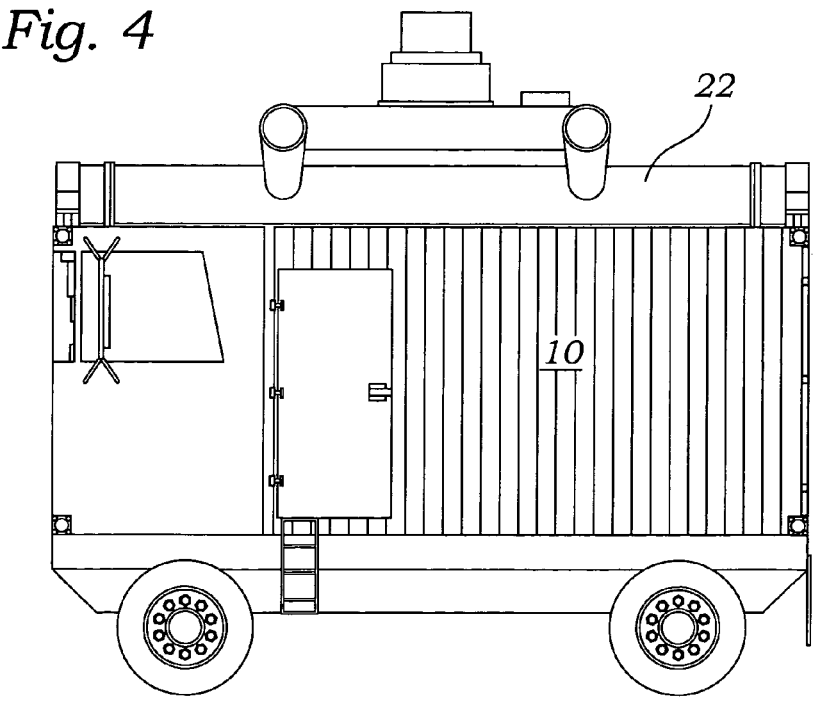
FIG. 4 is a left-side elevational view of the invention, illustrating a crane engaged to the combination for lifting thereof.

At least two corner fittings 15 are included in upper forward corners 40a of the driver's cab 12 for facilitating lifting of the combination 10 by the crane 22 (FIG. 4). Preferably, two corner fittings 15 are further included in lower forward corners 40c of the driver's cab 12. The corner fittings 15 are each made of rigid, strong metallic material, such as steel or iron, and are rigidly connected to the combination 10 such that the combination 10 may be safely lifted and handled thereby.

The driver's cab 12 further includes rear view mirrors 12b, which are preferably extendable into a working position while the combination 10 is used as a vehicle, and retractable such that during transport of the combination 10 the mirrors 12b may each be retracted into the driver's cab 12 so as not to be impacted by adjacent stacks of shipping containers 32 or the like. In their retracted position, the mirrors 12b do not extend out past the width F of the standard shipping container 32.

At least one of the driver controls 12c includes a switch (not shown) for actuating running lights 20d, tail lights 20b, and headlights 20e. A power source 16e, such as an alternator and battery, is electrically connected to the engine means 16b and driver controls 12c, as is known in the art, to power the lights 20d, 20b, 20e, and other driver controls 12c.

A container portion 14 is fixed to and above the frame at a rear end 16f thereof. The container portion 14 is essentially hollow and is adapted for cargo (not shown) to be transported therein. The container portion 14 includes at least two of the corner fittings 15 in upper rear corners 40b thereof. The corner fittings 15 of the container portion 14 are at substantially the same height as the corner fittings 15 of the driver's cab 12, such that when the combination 10 is lifted by the crane 22 by the top four corner fittings 15 the combination 10 will remain substantially level. Preferably two additional corner fittings 15 are included at lower rear corners 40d thereof. The container portion 14 further includes rear doors 14b (FIG. 2), at least one side door 14a (FIG. 1), a substantially corrugated top wall 60a (FIG. 3), and side walls 60b, similar to those of the standard shipping container 32. The doors 14a, 14b may each be further equipped with door locks 14c.

Figure 2:
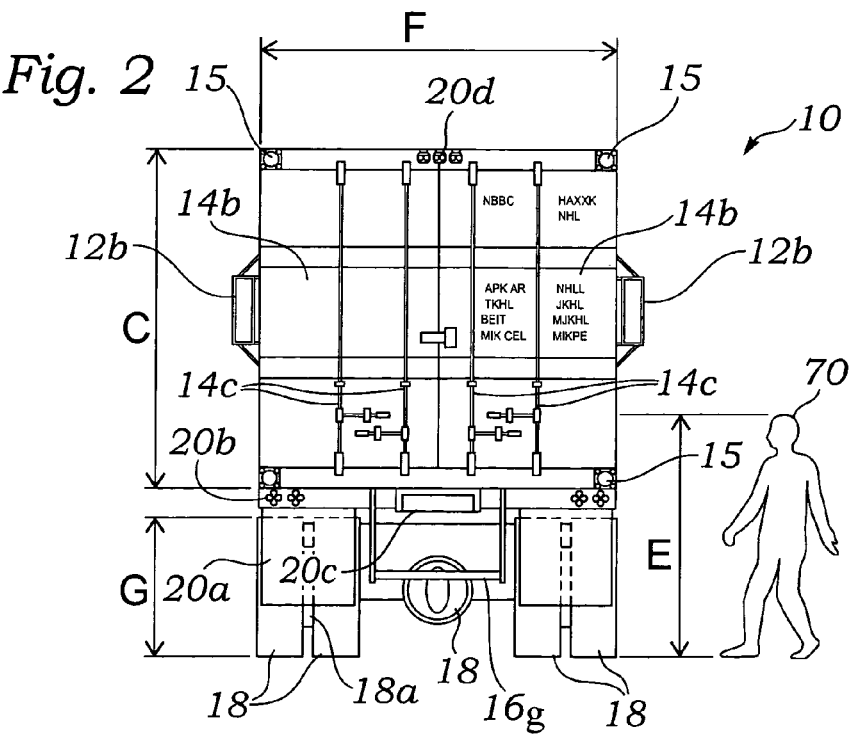
FIG. 2 is a rear-elevational view of the invention, illustrating a man of average height in relation to the combination of the present invention.
Figure 3:
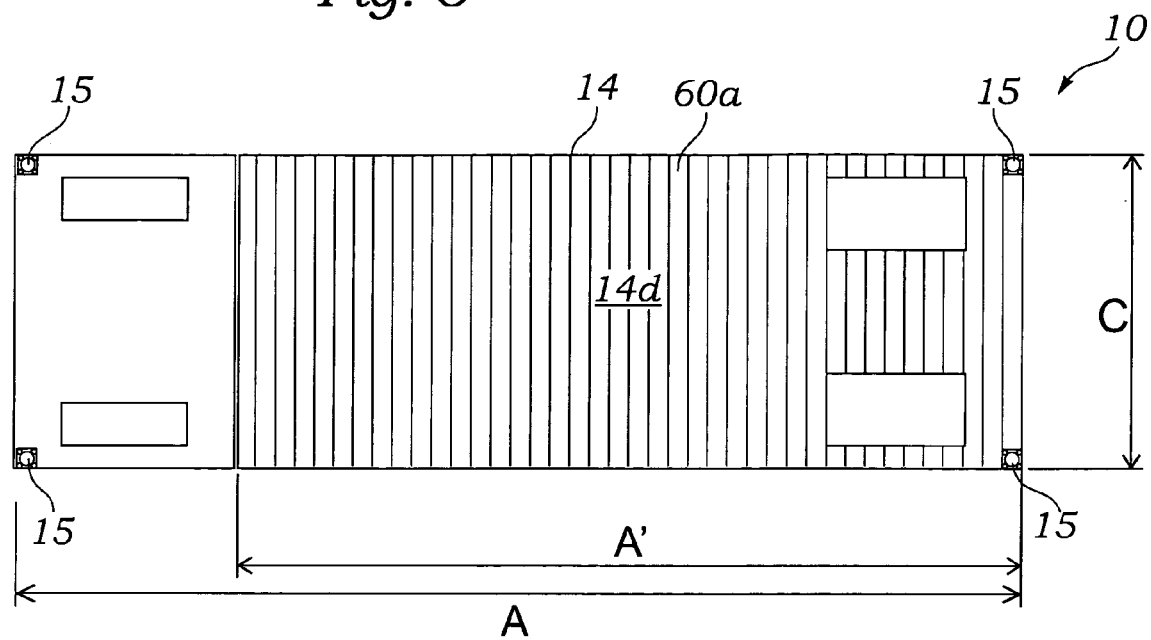
FIG. 3 is a top-plan view of the container portion of the invention.

The overall height of the combination 10 is the height C of the standard shipping container 32 plus the height D of the frame 16 plus half of a height G of the wheels 18. Preferably C is approximately eight feet, D is approximately two feet, and G is approximately 42 inches, although other dimensions for C, D and G may be used as conventions for standard shipping containers are changed. Optionally, a ladder 16f and a stepping platform 16g are further included on the frame 16 so that a person 70 of average height E, such as six feet, may be able to easily access the container portion 14 (FIG. 2). The frame 16 may further include a license plate holder 20c, a flap 20a for each wheel 18, and any other required equipment to conform to vehicular laws in various jurisdictions.

Figure 5:
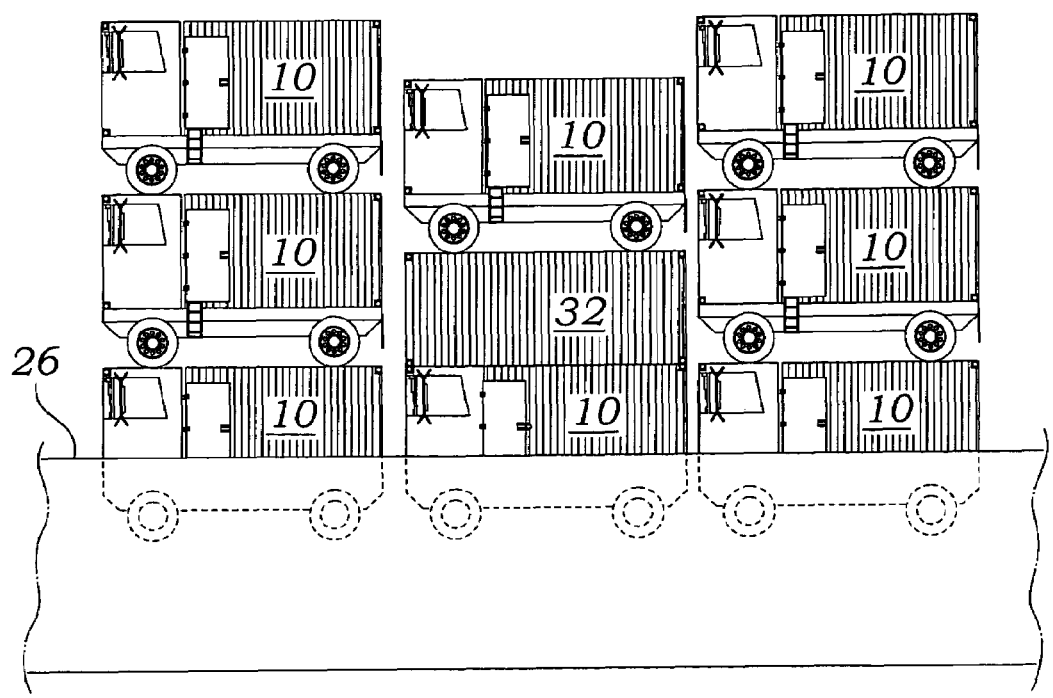
FIG. 5 is a partial left-side elevational view of a ship carrying a plurality of combinations of the present invention in a stacked configuration, and further illustrating a standard shipping container included in the stack.
Figure 6:
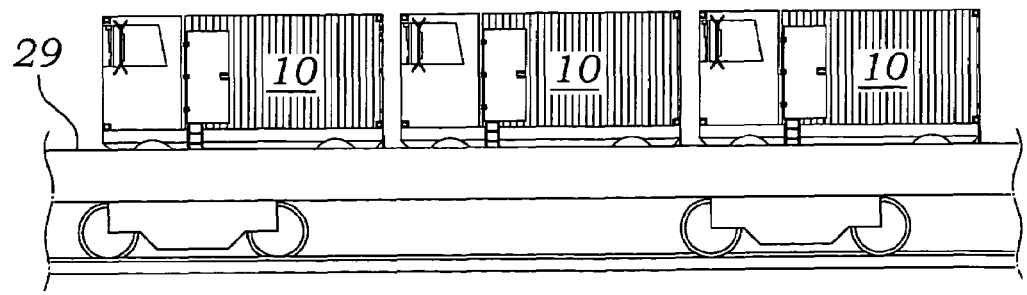
FIG. 6 is a partial left-side elevational view of a railcar carrying a plurality of combinations of the present invention.

A top surface 14d of the container portion 14 is preferably coplanar with a top surface 12d of the driver's cab 12, and each top surface 12d, 14d cooperates with a lower surface of the standard shipping container 32 to allow stacking of the standard shipping container 32 thereon. Further, each top surface 12d, 14d cooperates with the at least four wheels 18 of another combination 10 to allow stacking of the other combination 10 thereon (FIG. 5).

Some preferred dimensions for the combination 10 are shown in the following table:

| Dimension on Drawings | Description | Value (ft.) |
| --- | --- | --- |
| A | Length of Combination 10 | 20 |
| A | Length of Combination 10 | 40 |
| A' | Length of Container Portion 14 | 15 |
| A' | Length of Container Portion 14 | 35 |
| B | Length of Driver's Cab 12 | 5 |
| C | Height of Container Portion 14 | 8 |
| C | Height of Container Portion 14 | 8.5 |
| D | Height of Frame 16 | 2 |

-continued

| Dimension on Drawings | Description | Value (ft.) |
| --- | --- | --- |
| F | Width of Combination 10 | 8 |
| G | Height of Wheels 18 | 3.5 |

While a particular form of the invention has been illustrated and described, it will be apparent that various modifications can be made without departing from the spirit and scope of the invention. For example, various sizes of container dimensions A-G may be used so as to coordinate with other various sized shipping containers 32. Further, various other configurations of doors 14a, 14b may be used than that shown in the drawings. Accordingly, it is not intended that the invention be limited, except as by the appended claims.

What is claimed is:

1. A combination shipping container and vehicle comprising:
    a vehicle frame, the frame being generally a length and width of a standard shipping container and having a forward and rear end;
    an engine supported by the frame;
    a suspension for supporting at least four wheels by the frame;
    a transmission for transferring rotational energy from the engine to at least two of the wheels;
    a driver's cab fixed to and above said vehicle frame at said forward end thereof, the driver's cab having corner fittings and including driver controls for controlling the engine, steering and braking of at least two of the wheels, the driver's cab further including at least two of said corner fittings in upper forward corners thereof; and
    a container portion fixed to and above said vehicle frame at said rear end, the container portion for containing cargo and including at least two corner fittings in upper rear corners thereof, the corner fittings of the container portion being at substantially the same height as said at least two of said corner fittings of the driver's cab such that an overall width and length of the combination is substantially equal to a width and length of a standard shipping container.

2. The combination of claim 1 wherein the driver's cab includes at least two of said corner fittings in the lower forward corners thereof and the container portion including at least two corner fittings in lower rear corners thereof, the corner fittings of the lower rear corners of the container portion being at substantially the same height as the corner fittings of the lower forward corners of the driver's cab.

3. The combination of claim 1 wherein the vehicle frame further includes at least two generally parallel and horizontal forklift pockets therein and adapted such that a forklift may engage the forklift pockets with a fork and lift the combination thereby.

4. The combination of claim 1 wherein the container portion includes rear doors substantially the same size as those of an ISO standard shipping container.

5. The combination of claim 1 wherein at least one side door is included in the container portion.

6. The combination of claim 1 wherein the driver's cab further includes retractable rear-view mirrors, the mirrors being retractable into the driver's cab during transport of the combination and extendible to a working position while driving the vehicle.

7. The combination of claim 1 further including running lights, tail lights, and headlights all connected to a power source and controllable by at least one switch included in the driver controls.

8. The combination of claim 1 wherein the engine is a diesel engine and further includes a fuel tank in liquid communication therewith.

9. The combination of claim 1 wherein the combination includes a top surface of the container portion which is coplanar with a top surface of the driver's cab, and wherein the combination includes a lower surface and an upper surface adapted to allow vertical stacking of said combination and wherein the upper surface receives four wheels of another combination shipping container and vehicle to allow vertical stacking of the another combination shipping container and vehicle thereon.

10. The combination of claim 1 wherein the container portion includes at least two corrugated side walls and a corrugated top surface.

11. The combination of claim 1 wherein the transmission transfers rotational energy from the engine to each of the at least four wheels.

* * * * *